PHONOGRAPH RECORD

Filed Dec. 23, 1948

Inventor

JOHN HAYS HAMMOND, JR.

By

Attorney

Patented June 13, 1950

2,511,708

UNITED STATES PATENT OFFICE 2,511,708

PHONOGRAPH RECORD

John Hays Hammond, Jr., Gloucester, Mass.

Application December 23, 1948, Serial No. 66,857

1 Claim. (Cl. 274—42)

This invention relates to phonograph records and more particularly to a long playing type of disc record which carries several different selections.

An object of the invention is to provide a record of the above type having suitable indicating means for locating the positions of the different selections.

A further object of the invention is to provide a record of the above type made of a transparent plastic in which is embedded a disc provided with colored segments on which are marked the names of the various selections on the record.

The invention also consists in certain new and original features of construction and combinations of parts hereinafter set forth and claimed.

Figure 1:
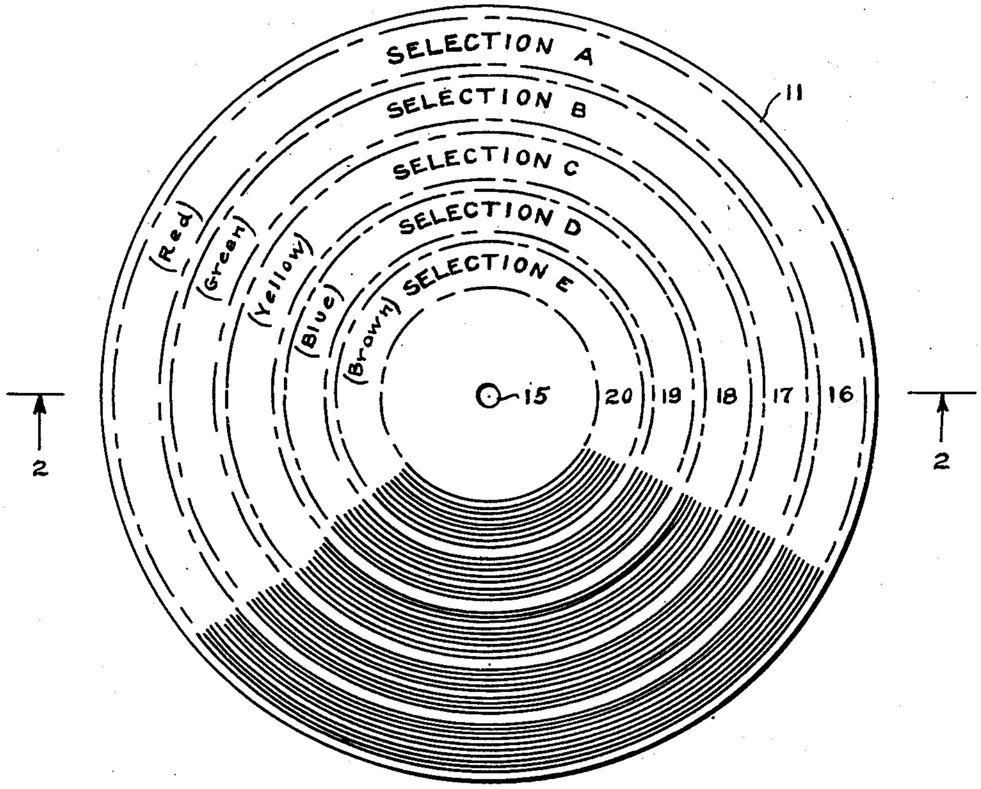
Figure 2:
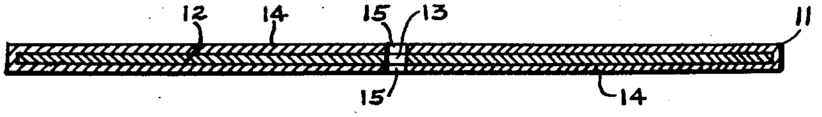

The nature of the invention, as to its objects and advantages, the mode of its operation and the manner of its organization, may be better understood by referring to the following description, taken in connection with the accompanying drawing forming a part thereof, in which Fig. 1 is a plan view of a phonograph record embodying this invention, and Fig. 2 is a sectional view taken on line 2—2 of Fig. 1.

Like reference characters denote like parts in the several figures of the drawing.

In the following description parts will be identified by specific names for convenience, but they are intended to be generic in their application to similar parts.

Referring to the drawing a standard disc phonograph record 11 is shown of the type having a special sound track in which the sound record is cut. The record is of the long playing type and contains several selections, for example five selections. This type of record is composed of a circular disc 12 made, for example, of aluminum, paper, or other suitable material which is capable of receiving the designations such as color or printed titles provided with a hole 13 to fit over the shaft of the turntable. The disc 12 is covered on both sides with a suitable material, such for example, as a transparent plastic 14, which is also provided with a hole 15 in line with the hole 13 in the disc 12.

It is assumed that the different selections are disposed in concentric areas 16 to 20 progressing from the outer periphery to the center and are arranged for continuous playing without interruption between selections except possibly for a slight pause represented by one or more turns of the sound track on which no sound record is cut.

In accordance with this invention, I provide different colors on the disc 12 in concentric areas corresponding to the concentric areas 16 to 20 of the sound record. In the embodiment shown the colors are indicated as red, green, yellow, blue and brown. However any desired combination of colors may be used. Marked on the disc 12 in the areas 16 to 20 are the names of the selections, such as "Selection A," Selection B, etc. The names of the selections and colors are visible through the transparent coating 15 and constitute a guide for the positioning of the needle for the playing of the desired selection. The names of the selections may also be marked on the disc 12 between the areas 16 to 20 if so desired.

Although only a few of the various forms in which this invention may be embodied have been shown herein, it is to be understood that the invention is not limited to any specific construction but might be embodied in various forms without departing from the spirit of the invention.

What is claimed is:

A disc phonograph record comprising a first disc of transparent plastic material having a spiral sound track on one surface thereof carrying recordings of a plurality of different selections each selection being in a different concentric area thereof, and a second disc secured to the opposite surface of said first disc and carrying bands of contrasting colors, each color band being co-extensive with the recording area of one of said selections and being visible through said first disc, whereby the entire area carrying each selection appears in a distinctive color.

JOHN HAYS HAMMOND, Jr.

REFERENCES CITED

The following references are of record in the file of this patent:

FOREIGN PATENTS

| Number | Country | Date |
|---|---|---|
| 315,104 | Great Britain | July 11, 1929 |
| 325,199 | Great Britain | Feb. 6, 1930 |
| 717,049 | France | Dec. 31, 1931 |
| 738,285 | France | Dec. 23, 1932 |